United States Patent [19]
Imamoto et al.

[11] 4,444,505
[45] Apr. 24, 1984

[54] OFFSET PRINTING PLATE PRINTING IMAGE AREA MEASURING DEVICE

[75] Inventors: Tsunehiko Imamoto, Yokohama; Satoru Horiguchi, Saitama, both of Japan

[73] Assignee: Dai Nippon Insatsu Kabushiki Kaisha, Japan

[21] Appl. No.: 473,195

[22] Filed: Mar. 8, 1983

[30] Foreign Application Priority Data

| Aug. 3, 1979 [JP] | Japan | 54-99262 |
| Oct. 11, 1979 [JP] | Japan | 54-129997 |
| Jan. 23, 1980 [JP] | Japan | 55-5653 |
| Apr. 30, 1980 [JP] | Japan | 55-57465 |

[51] Int. Cl.$^3$ ............................................. G01B 11/28
[52] U.S. Cl. ............................................. 356/380
[58] Field of Search ............... 356/379, 380; 101/350, 101/365

[56] References Cited

U.S. PATENT DOCUMENTS 3,280,692 10/1966 Milnes ................................. 356/380
3,782,833 1/1974 Biggs et al. ......................... 356/380

FOREIGN PATENT DOCUMENTS

2236730 2/1973 Fed. Rep. of Germany ...... 356/380

Primary Examiner—Bruce Y. Arnold
Attorney, Agent, or Firm—Parkhurst & Oliff

[57] ABSTRACT

A system in which data for controlling amounts of ink for a number of printing machines, having a variety of printing plates, are measured with one measuring device. This invention provides a printing image area measuring device which can detect a printing image area with high accuracy even if the surface of a printing plate is uneven, which device is simple in construction, low in manufacturing cost and high in measurement accuracy, and which can provide in-line automatic measurement in a printing line.

6 Claims, 22 Drawing Figures

OFFSET PRINTING PLATE PRINTING IMAGE AREA MEASURING DEVICE

BACKGROUND OF THE INVENTION

This invention relates to a device for measuring a printing area (or a printing image area) by using a printing plate for an offset printing machine, and more particularly to a printing image area measuring device which can detect the surface of a printing plate with high accuracy even if the surface is uneven.

In addition to a method of this type, many printing image area measuring methods are known in the art. For instance, there are methods of using proofs, actual prints, reflection copies, transparent copies and so on. Furthermore, known in the art are a method in which the printing image area measurement value is utilized to check the density of prints during the operation of the printing machine to feed back the density thus checked to the printing machine, and a method in which the printing image area measurement value is used to preset an amount of ink to be supplied before a printing operation is carried out.

In general, the printing image of a printing plate is obtained by subjecting a plurality of copies arranged in place to printing. Therefore, the methods other than those in which printing plates or prints are utilized for measuring printing image areas are disadvantageous in that it is necessary that, after individual printing image areas have been measured, the measurement data are summed with the layout on the printing plate taken into account. On the other hand, in the method of utilizing printing plates or prints for obtaining measurement data, the measurement data can be immediately used. In the case of obtaining measurement data from a print, a feed-back control system correcting variations due to external disturbance during a printing operation is established because the measurement is effected after the printing operation has been started. In the case of obtaining measurement data from a printing plate, it is intended to provide satisfactory prints even at the start of a printing operation by presetting the degrees of opening of the ink adjusting keys before the printing operation is started.

A variety of devices for measuring printing image areas by using a printing plate are known in the art. In a first example of the conventional device, a printing plate wrapped around a cylinder is rotated at high speed, and each of the average value of the afterimages of divisional bands is measured (cf. Japanese Patent Application Publication No. 42205/1972). In a second example, an offset printing plate is scanned to obtain the number of pulses corresponding to the printing area, thereby to adjust the amount of ink to be supplied (cf. Japanese Patent Application Laid-Open No. 53804/1973). In a third example, the printing area of a printing plate is detected and integrated for every ink adjusting key, the intensity of reflection light from the nonprinting area is detected by using an auxiliary printing plate, and signals representative of the printing area only are processed by using the detection signals of the printing plate to provide a value corresponding to the printing area, thereby to control the amount of ink to be supplied (cf. Japanese Patent Application Laid-Open No. 67714/1974). In a fourth example, a printing plate is scanned longitudinally to measure the printing area occupation percentage in a widthwise direction, whereby the amount of ink to be supplied is controlled in the ink fountain roller section (cf. Japanese Patent Application Laid-Open No. 2505/1976). In a fifth example, a photoelectric detector disposed in place laterally of a printing surface or the surface of a printing plate is moved longitudinally in a scanning manner to obtain the total amount of ink, thereby to control the amount of ink to be supplied.

However, these conventional devices are not practical because printing image areas cannot be detected with high accuracy. This will be described in more detail.

Figure 1:
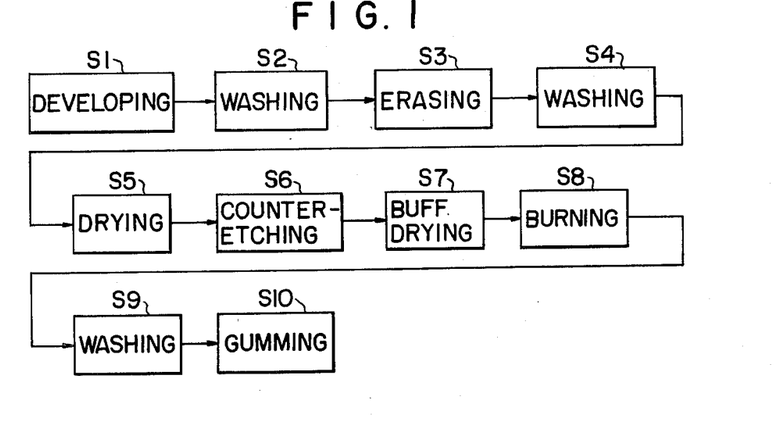
FIG. 1 is a flow chart illustrating the steps of processing a printing plate.

A printing plate is subjected to exposure through a transparent film copy placed in close contact therewith, and is then processed in accordance with processing steps shown in FIG. 1. In developing a positive type printing plate used usually (Step S1), a portion of the photosensitive layer which is exposed to light (i.e. a non-printing area) is removed so that no ink is applied thereto. However, after the development an unnecessary photosensitive layer may be partially left on the printing plate, and it is dissolved by applying an erasing liquid to it only (Step S3). After the printing plate has been dried (Step S4), a counter-etching liquid is applied to the entire surface of the printing plate (Step S5). Thereafter, the printing plate is subjected to buff drying to dry the counter-etching liquid on the surface of the printing plate (Step S7). The counter-etching and buff drying processes are preliminary processes effected before a burning (high temperature treatment) process is carried out. The printing plate is subjected to burning (Step S8), as a result which the endurance of the printing plate is increased two or three times. Finally, the printing plate is subjected to so-called "gumming" in order to protect the surface of the nonprinting area and to increase the hydrophilic characteristic of the printing plate (Step S10). Thus, all the steps of processing the printing plate have been accomplished.

In the above-described steps of process, the step of burning is considerably effective in improving the endurance of the printing plate. However, since a printing plate is heated at high temperatures ranging from 250° C. to 300° C. in the step of burning, an ordinary printing plate having a hard aluminum plate as its base material is thermally deformed. This deformation remains after the printing plate has been cooled, and therefore the flatness of the printing plate is reduced. Accordingly, if a printing image area is obtained from such a printing plate by detecting the intensity of light reflected thereby, then the intensity of light reflected is varied depending on the printing image area or with the extent of unevenness of the printing plate or with the deviation in position of the printing plate, as result of which it is impossible to correctly detect the printing image area and accordingly it is impossible to correctly determine the amount of ink to be supplied.

In the case where a number of printing machines different in kind are available, usually a variety of printing plates are processed in the step of printing with printing plates. Therefore, it is desirable that a meter for measuring a printing image area by using a printing plate is used integrally with a printing line at a printing site instead of a printing machine at the printing site; that is, it is desirable to employ a method in which data for controlling the amounts of ink of a number of printing machines are measured with one measuring device.

SUMMARY OF THE INVENTION

Accordingly, an object of this invention is to provide a printing image area measuring device which can detect a printing image area with high accuracy even if the surface of a printing plate is uneven.

Another object of the invention is to provide a printing image area measuring device which is simple in construction, low in manufacture cost and high in measurement accuracy, and which can provide in-line automatic measurement in a printing line.

A further object of the invention is to provide a printing image area measuring device which is high in operability, and less in work error, and which occupies a small space.

The nature, principle and utility of the invention will become more apparent from the following detailed description when read in conjunction with the accompanying drawings.

BRIEF DESCRIPTION OF THE DRAWINGS

In the accompanying drawings:

The parts (A) and (B) of FIG. 5 are a side view and a front view, respectively, schematically showing the construction of the photoelectric detector device;

The parts (A) and (B) of FIG. 6 are a front view and a side view, respectively, showing the external appearance of a measuring device according to the invention;

FIG. 16 is an explanatory diagram showing a third example of the light receiving section of the photo-electric detector device according to the invention;

FIG. 17 is an explanatory diagram showing one modification of the light receiving section in FIG. 16; and The parts (A), (B) and (C) of FIG. 18 are a front view, a side view and a plan view of another example of the printing image area measuring device according to the invention.

DETAILED DESCRIPTION OF THE INVENTION

Figure 2:
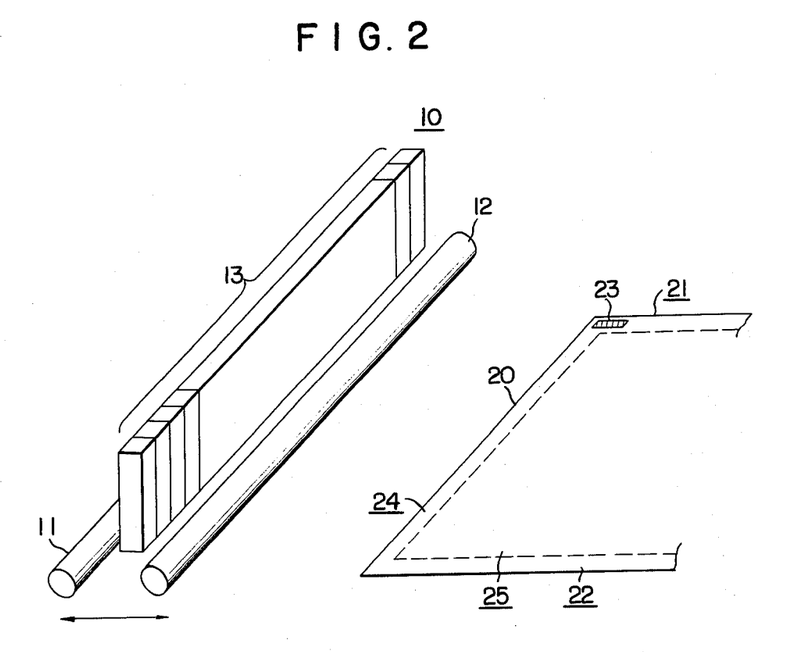
FIG. 2 is an explanatory diagram showing the positional relationships of a movable photoelectric detector device according to the invention and a printing plate being conveyed.

In this invention, as shown in FIG. 2 a printing plate 20 is fixedly provided below a straightly extended movable photoelectric detector device 10. The printing plate 20 is scanned linearly by moving the photo-electric detector device 10 by a conveying device (described later).

A calibration mark 23 is provided in the gripper margin 21 of the printing plate 20 (or the gripper end 22 or a portion of the printing plate 20 which gives no bad influence to printing). The calibration mark 23 is rectangular for instance. Alternatively, a solid portion of the printing area is employed as the calibration mark. The non-printing area (Al grained portion) 24 and the printing area (or printing image) 25 are recognized with the aid of the calibration mark 23.

The photoelectric detector device 10 comprises: a pair of cylindrical fluorescent lamps 11 and 12 which are arranged in parallel so as to provide a linear irradiation plane; and a photoelectric detector 13 having a number of photoelectric detector units $S_0, S_1, S_2, \ldots S_n$ arranged in one line.

Figure 4:
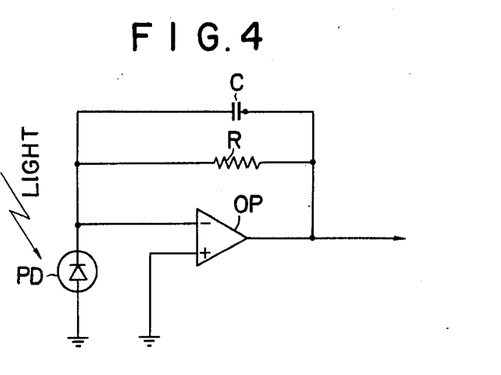
FIG. 4 is a circuit diagram showing the arrangement of each of the photoelectric detector units which form the photoelectric detector device.

Each of the photoelectric detector units has a circuit as shown in FIG. 4. That is, the unit S comprises: a photo diode PD for subjecting light reflected by the printing plate 20 to photoelectric conversion; an operational amplifier OP to one input terminal of which the output of the photo diode PD is applied, the other input terminal being grounded; and resistor R and a capacitor C which are connected between the input and output of the operational amplifier OP.

Figure 5A:
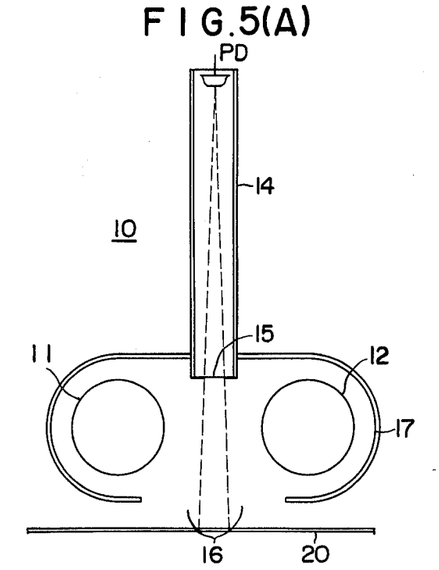
Figure 5B:
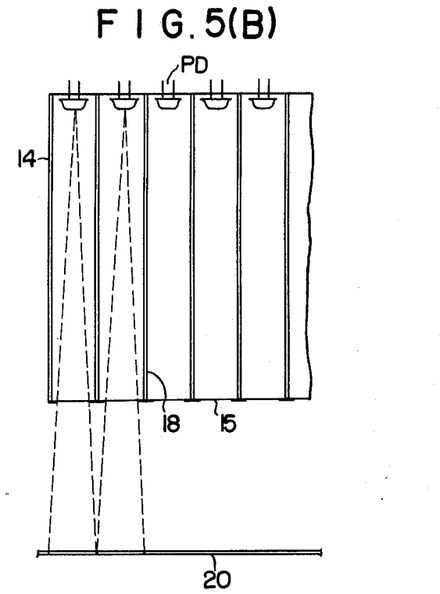

The construction of the photoelectric detector 13 ($S_0$-$S_n$) is as shown in FIG. 5. The photoelectric detector 13 comprises: a cylindrical shield box 14 which is divided by partitions 18 into a number of chambers which are provided for the photoelectric detector units $S_0$ through $S_n$ respectively. Each chamber has the photo diode PD at the upper end portion and a slit 15 for receiving reflection light at the lower end portion. The photo electric detector 13 further comprises a light intercepting box 17 with a slit 16 for receiving light reflected from the printing plate 20. The light intercepting box 17 is so arranged as to surround not only the slits 15 of the shielding box 14 but also the fluorescent lamps 11 and 12.

Figure 6A:
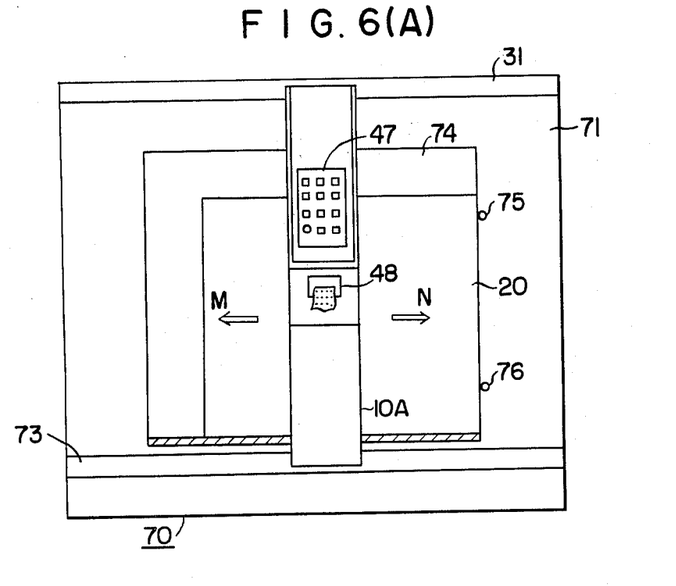
Figure 6B:
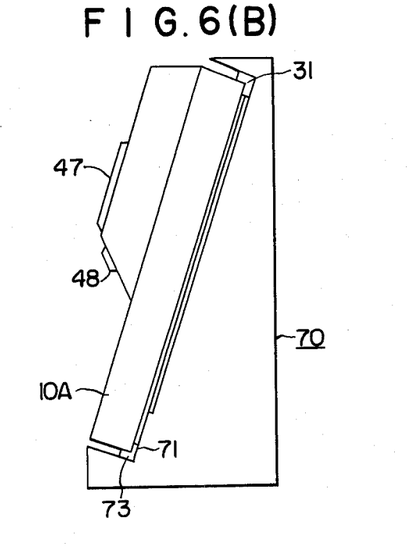

A concrete example of the photoelectric detector device 10 thus organized is as shown in FIG. 6. A measuring device body 70 has a sloped front panel 71. Racks 31 and 73 are arranged at the upper end portion and at the lower end portion of the front panel 71, respectively. A stage 74 for placing a printing plate 20 is provided at the central portion of the front panel 71. The printing plate 20 is positioned by pins 75 and 76 and is then sucked and retained in place by a sucking device (described later) 38. The stage 74 is made of a porous sheet or a plate in which a number of minute holes are formed. A box-shaped scanning device 10A including the above-described photoelectric detector device 10 and a necessary circuit is disposed between the racks 31 and 37. A key board 47 and printer 48 (described later) are provided on the upper surface of the scanning device 10A. As is clear from the above description, the printing plate 20 is disposed between the scanning device 10A and the stage 74. As the scanning device 10A is moved in the direction of the arrow M or N, the printing plate 20 is line-scanned by the photoelectric detector device 10 provided in the lower portion of the scanning device 10A.

Figure 7:
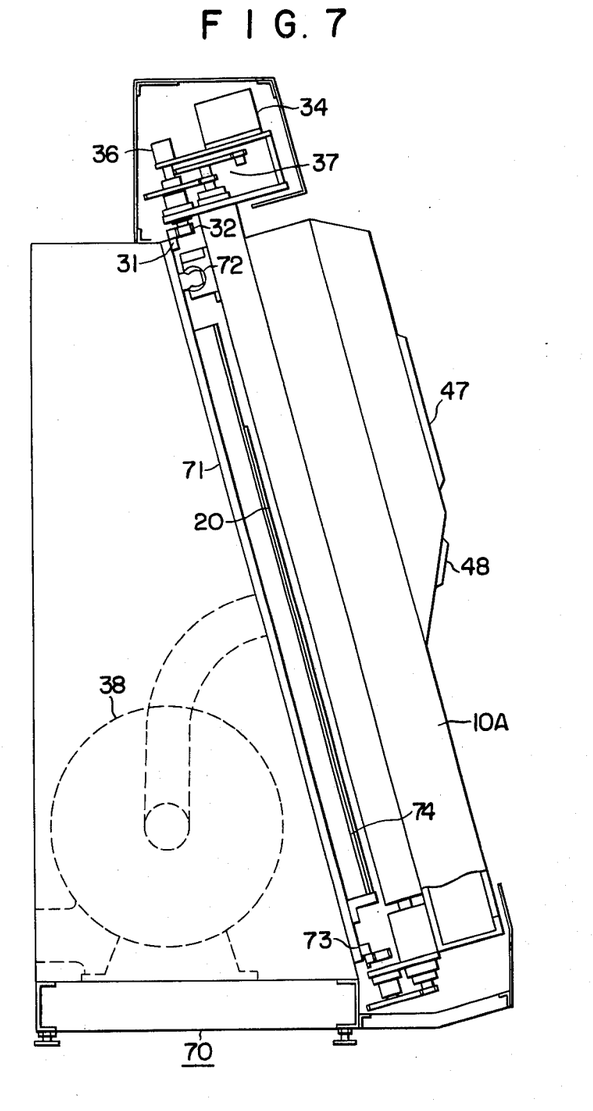
FIG. 7 is an explanatory diagram showing the mechanism of a part of the measuring device shown in FIG. 6.

The scanning mechanism of the scanning device 10A, as shown in FIG. 7, comprises the rack 31 extended along the upper edge of the front panel 71 and a pinion 32 engaged with the racks 31 and 73, to move the scanning device 10A which is movably supported by a guide rail 72. The pinion 32 is driven through a gear mechanism 37 by an electric motor 34. A rotary encoder 36 for detecting a position of the scanning 10A is mounted on the shaft of the gear mechanism. Provided below the stage 74 is the aforementioned sucking device made up of a suction pump for sucking and retaining the printing plate 20 on the stage 74.

Figure 8:
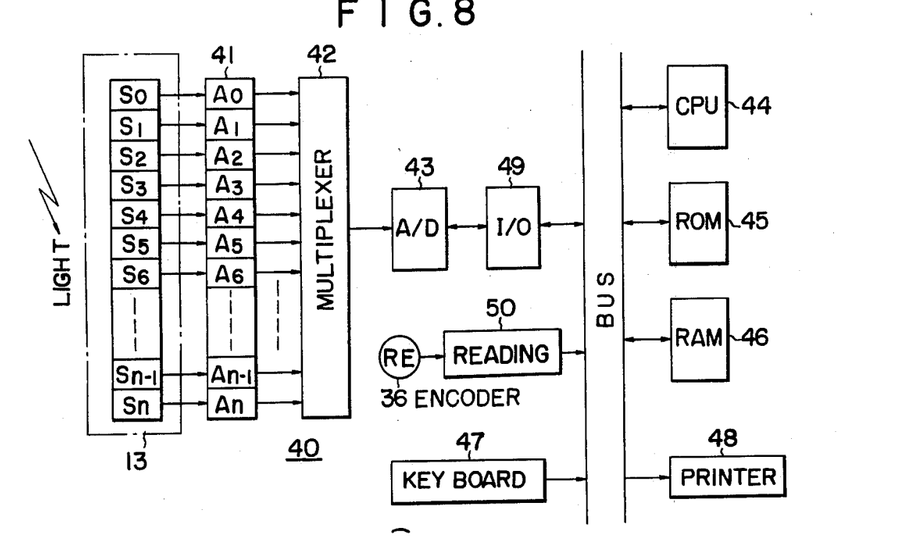
FIG. 8 is a block diagram showing one example of a processing device according to the invention.

A processing device 40 for obtaining a printing image area from detection signals, as shown in FIG. 8, comprises: an amplifier circuit 41 (consisting of amplifier circuit units $A_0$ through $A_n$) for amplifying the output detection signals of the photoelectric detector 13 respectively; a multiplexer 42 for selectively outputting the output signals of the amplifier circuit 41 in accordance with a processing program; an analog-to-digital converter 43 for converting the output of the multiplexer 42 into a digital signal (hereinafter referred to as "an AD converter 43"); a central processing unit 44 (hereinafter referred to as "CPU 44"); memory means, i.e. a read-only memory 45 (hereinafter referred to as "a ROM 45") and a random access memory 46 (hereinafter referred to as "a RAM 45"); a key board 47 for inputting data and other necessary numerical values; a printer 47 for printing out process results; and an input and output control device 49 for controlling the input and output operations between the AD converter 43 and the CPU 44, etc. The input and output control device 49 is connected through a bus line to the CPU 44, the ROM 45, the RAM 46, the key board 47 and the printer 48. The output of the rotary encoder 36 is applied through a reading circuit 50 and the bus line to the CPU 44.

If the following relative positional relation is established for the printing plate 20, the photoelectric detector 10 for detecting an amount in intensity of light reflected by the printing plate 20 and the fluorescent lamps 11 and 12, then a detection error due to the uneven surface of a printing plate which may be caused for instance by a burning process can be minimized. The term "relative positional relation" is intended to mean the positional relation most suitable for measurement in which the fluorescent lamps 11 and 12 are arranged in parallel with the printing plate 20, the printing plate 20 is spaced apart from the lamps 11 and 12 by a distance (x) equal to 0.35 to 0.70 times, preferably 0.4 to 0.6 times, the distance (2 K) between the axes of the fluorescent lamps 11 and 12 (this position of the printing plate 20 being referred to as "a standard position" hereinafter), and the photoelectric detector device 10 is confronted with the printing plate 20 so as to receive only the light reflected by a detection region P around a position on the printing plate 20 which is equal in distance from the two fluorescent lamps 11 and 12.

An optical relation between the photoelectric detector device 10 and the printing plate in the relative position relation described above will be described. Since the fluorescent lamps 11 and 12 are linear light sources, the illumination is inversely proportional to a distance from the light sources. In the case of a point light source, the illumination is in inverse proportion to the square of a distance from the light source. However, in the case of a linear light source, it can be considered that the linear light source is obtained by arranging a number of point light sources in a line, and therefore the illumination on a surface is the sum of illuminations provided by the number of point light sources; that is, it can be understood by integrating the illuminations provided by the number of point light sources that the illumination of the surface is inversely proportional to the distance from the linear light source. On the other hand, the illumination of a first surface which is not at right angles with respect to light projected by the light sources is $\sin \theta$ times that of a second surface which is at right angles with respect to the light (where $\theta$ is an angle which is formed between the first and second surfaces). Accordingly, the illumination I of the detection region P in FIG. 8 is:

$$I_{(x)} = A \cdot [x/(K^2 + x^2)] \tag{1}$$

where A is the proportional constant. It is assumed that the printing plate 20 is set at the predetermined position $x_0$ with a difference $\Delta x_0$ in position due to the uneven surface of the printing plate 20. In this case, the illumination with $x = x_0$ is, of course, different from the illumination with $x = x_0 + \Delta x_0$, and therefore a measurement error corresponding to the difference arises.

Figure 9:
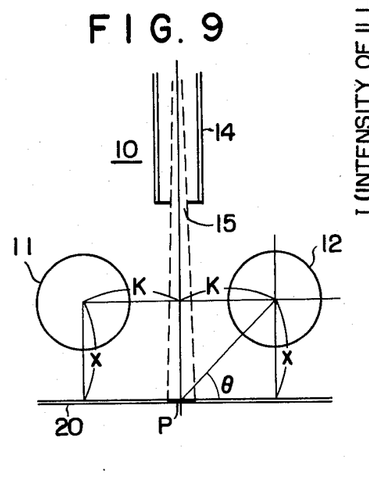
FIG. 9 is a diagram for a description of the optimum relative position of a printing plate and fluorescent lamps.
Figure 10:
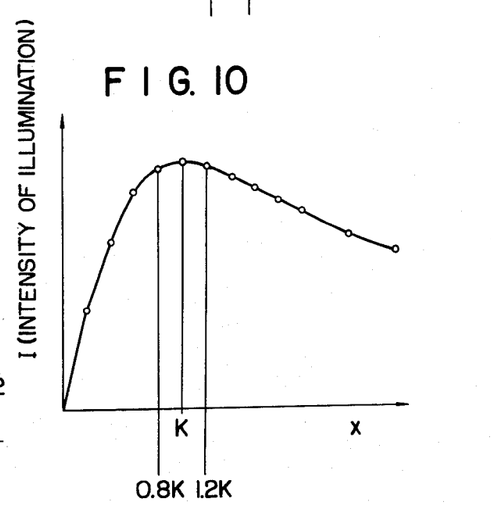
FIG. 10 is a diagram indicating the relation of distance (x) to illumination, which is used in the description of the optimum relative position.

The illumination $I_{(x)}$, as illustrated in FIG. 9, is a function having its maximum value with $x = K$, and therefore in the vicinity of the maximum value the illumination $I_{(x)}$ is less varied with the same difference in position. Therefore, if the printing plate 20 is set at the position $x = K$ and the detector device 10 is used to detect the detection region P, then the detection can be achieved with high accuracy even if the printing plate 20 is uneven. With $0.8 \text{ K} < \text{X} < 1.2 \text{ K}$, i.e. $0.4 \times 2 \text{ K} < \text{X} < 0.6 \text{ K}$, the illumination characteristic is substantially linear, and the detection can be accomplished with high accuracy.

Figure 11:
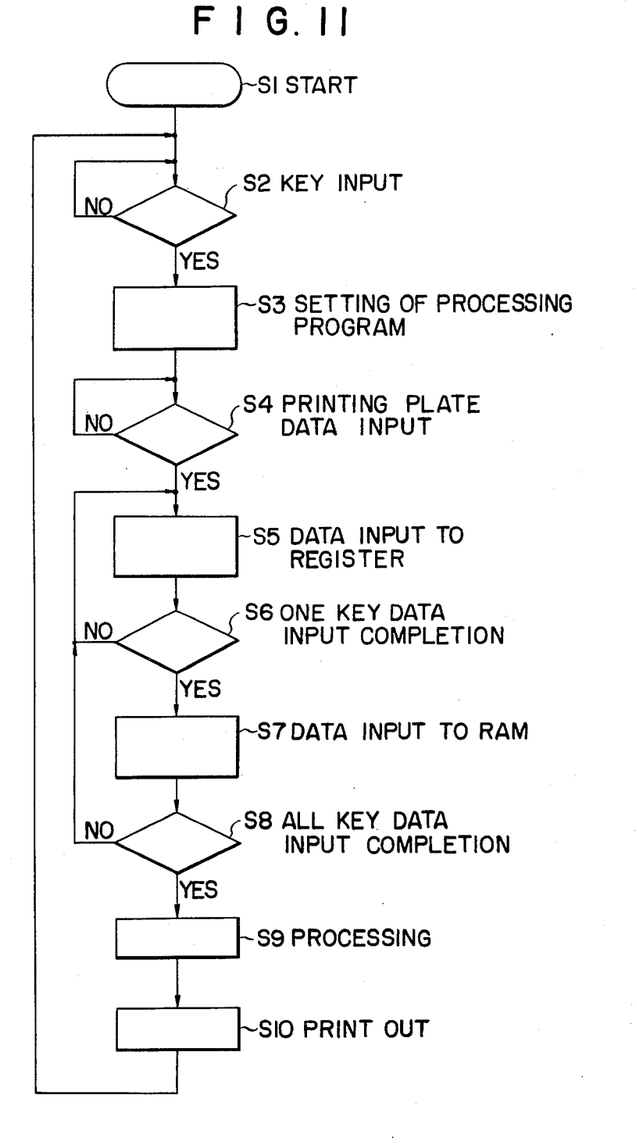
FIG. 11 is a flow chart indicating an example of the operation of a printing image area measuring device according to the invention.

The operation of the printing image area measuring device thus constructed will be described with reference to a flow chart in FIG. 11.

A printing plate 20 is set on the stage 74 with the pins 75 and 76, and the power switch is turned on (Step S1). As a result, the suction device 38 is operated to suck and retain the printing plate 20 on the stage 74, and the fluorescent lamps 11 and 12 are turned on. Then, data as to a printing machine number and classification of surface printing and backing printing in the case of a blanket to blanket web system printing machine are inputted by operating the key board 47 (Step S2). By these data, the data memorized in the ROM 46 is set. Examples of the data in the RAM 46 or the ROM 45 are printing plate size (for instance 1310 mm × 1050 mm, or 1160 × 940 mm), the number of ink adjusting keys (for instance thirty-two, or fifty), a key interval (for instance 30 mm, or 10 mm), and a distance between an effective printing region and the edge of a printing plate (for instance, top and down 22 mm and right and left 20 mm). Thus, the range of use of the photo-electric detector 13 ($S_1$-$S_k$ in FIG. 3), the interval and number of ink adjusting keys, etc. are set (Step S3).

Upon depression of the measurement start switch, the motor 34 is driven, so that the rotation of the motor 34 is transmitted through the gear mechanism 37, the pinion 32 and the rack 31 to the scanning device 10A and the latter 10A is moved in the direction of the arrow M or N in the part (A) of FIG. 6; that is, the photo-electric detector device 10 in the scanning device 10A detects the surface of the printing plate 20 in a scanning mode.

The scanning position of the photoelectric detector device 10 is detected by the rotary encoder 36, and the output of the rotary encoder 36 is applied through the reading circuit 50 and the bus line to the CPU so that the detection position coincides with the scanning movement. Light from the fluorescent lamps 11 and 12 reaches the printing plate (or the stage 74) through the slit 16, and light reflected thereby reaches through the slit 16 and the slits of the shielding box 14 to the photo diodes PD whereby it is converted into electrical data corresponding to the amount of optical intensity thereat.

Figure 3:
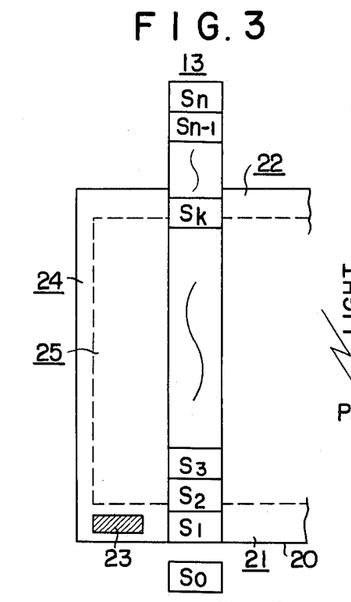
FIG. 3 is an explanatory diagram for a description of the scanning and detecting operation of the photoelectric detector device in FIG. 2.

The photoelectric detector unit $S_0$ in FIG. 3 is used to detect variations of the intensity of the light source (11 and 12) due to variations of the supply voltage and of the ambient temperature. The variations thus detected are corrected in the data processing which is carried out later. The photoelectric detector unit $S_1$ operates to detect the non-printing area 24 and the calibration mark 23 for calibration of the upper and lower limits of the intensity of light reflected, and the photoelectric detector unit $S_k$ is used to take as data only the outputs of the detector units in the effective printing region. The photoelectric detector unit for calibration is not limited to the detector unit $S_1$ in FIG. 3; that is, any photoelectric detector unit may be employed as the photoelectric detector unit for calibration depending on the calibration position.

When the output position data of the rotary encoder 36 coincides with the edge position data of the printing plate which is set in the program, the intensity of light reflected by the printing plate 20 is detected by the photoelectric detector device 10 (Step S4). The detection data which is selectively outputted by the multiplexer 42 according to the program is converted into a digital data by the AD converter 43 and is then applied through input and output control circuit 49 and the bus line to a register in the CPU 44 (Step S5).

Upon completion of inputting data corresponding to one ink adjusting key (Step S6), the data is transferred from the register in CPU 44 into the RAM 46 (Step S7). In this case, the detection data of the calibration mark 23 and the intensity of light from the light source are also similarly processed. As was described above, the outputs of the photoelectric detector 13 are selectively outputted by the multiplexer 42. The output of the multiplexer 42, after being subjected to analog-to-digital conversion, is stored in a address in the RAM 46 corresponding to a detection object (calibration mark, printing image, or light source). In this respect, it should be noted that a plurality of detection data are stored in the RAM 16 by carrying out the scanning plural times, so that the effect of errors due to noise is reduced. Thereafter, it is decided whether or not the detection data as many as the number of all ink adjusting keys have been taken (Step S8). When it is decided that the detection data as many as the number of all ink adjusting keys have been taken, then the calibration and the intensity of light from the light source are corrected by processing the data of the RAM 46, so as to obtain the total printing image area, an area percentage, and a printing image area with respect to each ink adjusting key (Step S9).

The information provided to the processor by detectors $S_O$, $S_1$ and $S_2$-$S_n$ (FIG. 3) is employed to both calculate and calibrate the percent of imaged area for each ink adjusting key of a given machine. For example, the data processing step S9 may include four operations namely, averaging the output data from the detectors concerning the printing image areas, correcting the data for variations in light intensity detected by $S_O$, determining the calibration factor from data provided by detector $S_1$ and finally calculating the corrected percent of printing image area within the region covered by the specific ink adjusting key. To achieve these results, three sets of data are stored in RAM 46 during steps S1 through S9. The first set involves a value (Pm) that is proportional to the amount of light reflected from the effective printing region corresponding to the subject key region m. The second involves a value (Qm) that is proportional to the amount of light reflected from the calibration mark found on the plate. The last involves a value (Rm) that is proportional to the quantity of illumination available from the light source during the period that the m region is being scanned.

As should be evident from the disclosure above, the three sets of data are the sums of detected values which are loaded into the CPV. For instance, Pm may be the sum of the product (hxi) where h represents the number of detectors spanning the printing image area and i the number of detected values. As noted, in this embodiment of the invention the values of both Qm and Rm are each sensed by one detector.

The data is then averaged as follows:

$$\overline{Pm} = Pm/(h \times i)$$

$$\overline{Qm} = Qm/i$$

$$\overline{Rm} = Rm/i$$

The average values are then corrected for changes in light intensity as follows:

$$\overline{Pm'} = \overline{Pm}/\overline{Rm}$$

$$\overline{Qm'} = \overline{Qm}/\overline{Rm}$$

As should now be obvious, the reflection factor from the non-imaged regions is greater than that from the printing image regions. A reflection factor of 100% thus represents a minimum printing value while a 0% is a maximum value. Accordingly, a maximum value or reading of Qm' can be used to calibrate the average data concerning the non-imaged region while the minimum Qm' value can be used to calibrate the average data concerning the printed regions on the plate.

The percentage E(%) of the printing image area in a given key region can now be simply found as follows:

$$E = [(Q'max - P'm)/(Q'max - Q'min)] \times 100$$

The average printing image area (F) is now determined:

$$F = E \times X \times Y$$

where X is the key interval and y is the vertical dimension of the effective printing region.

Figure 12:
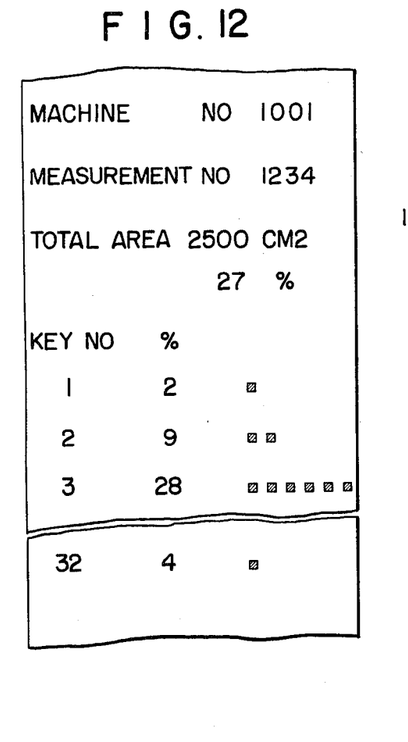
FIG. 12 is a diagram showing one example of a printed-out output of the measuring device of the invention.

In this case, processing the detection data corresponding to the ink adjusting keys is carried out by selectively using the width and number of ink adjusting keys which are stored in the ROM 45 or the RAM 46 in correspondence to the present printing machine number. The printing image area and the area percentage are printed out by the printer 48 (Step S10), as shown in FIG. 12.

Figure 13:
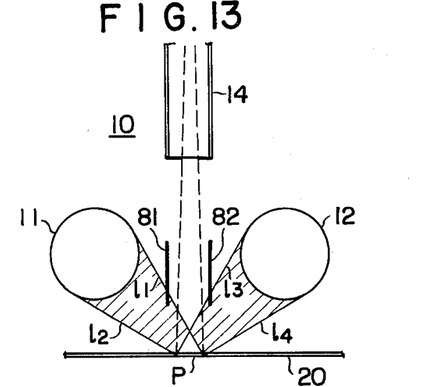
FIG. 13 is a diagram showing another example of the light receiving section of the photoelectric detector device according to the invention.
Figure 14:
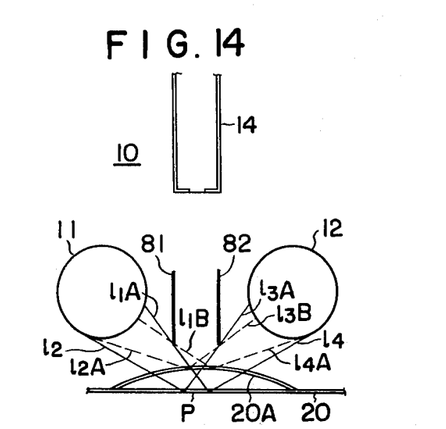
FIG. 14 is a diagram for a description of the operation of the light receiving section in FIG. 13.

In the above-described example of the measuring device, the light receiving section of the photoelectric detector device 10, the fluorescent lamps 11 and 12 and the printing plate 20 are arranged as defined by FIGS. 13 and 14. However, the measurement can be carried out more effectively if light intercepting boards 81 and 82 adapted to partially intercept light from the fluorescent lamps 11 and 12 are disposed in the spaces which are defined by segments $1_1$ and $1_2$, and $1_3$ and $1_4$ circumscribing the border lines of the detection region P and the fluorescent lamps 11 and 12, respectively. In this case, the set position (x) of the printing plate 20 is: $K < x < 1.4 K$. In the normal operation, i.e. when the printing plate 20 is located at the predetermined position, light beams from the fluorescent lamps 11 and 12 are in regions which are defined by segments $1_1A$ and $1_2$, and segments $1_3A$ and $1_4$ in FIG. 14, respectively.

Figure 15:
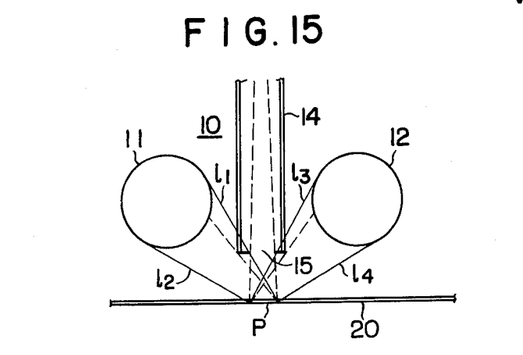
FIG. 15 is an explanatory diagram showing one modification of the device shown in FIG. 13.

It is assumed that the set position of the printing plate 20 is shifted upwardly as indicated at 20A in FIG. 14. Then, if no light intercepting boards 81 and 82 were provided, the illumination in the detection region would be increased. However, the provision of the light intercepting boards 81 and 82 allows the regions covered by the light beams from the fluorescent lamps 11 and 12 to be decreased to regions which are defined by segments $1_1B$ and $1_2A$ and segments $1_3B$ and $1_4A$ in FIG. 14; that is, in the case the effective region of light from the light source is decreased, and accordingly the illumination in the detection region P is also reduced. As the degree of variation in illumination of the detection region P with respect to variation in distance of the printing plate can be adjusted to a suitable value by determining the positions of the light intercepting boards 81 and 82, the measurement error due to the shift in position of the printing plate 20 can be corrected or cancelled by the variation in illumination of the detection region. Instead of the light intercepting boards 81 and 82, the photoelectric detector device 10 may be positioned in the above-described spaces in such a manner that side walls of the shielding box 14 serve as the light intercepting boards 81 and 82 as shown in FIG. 15.

Figures 16, 17, 18A:
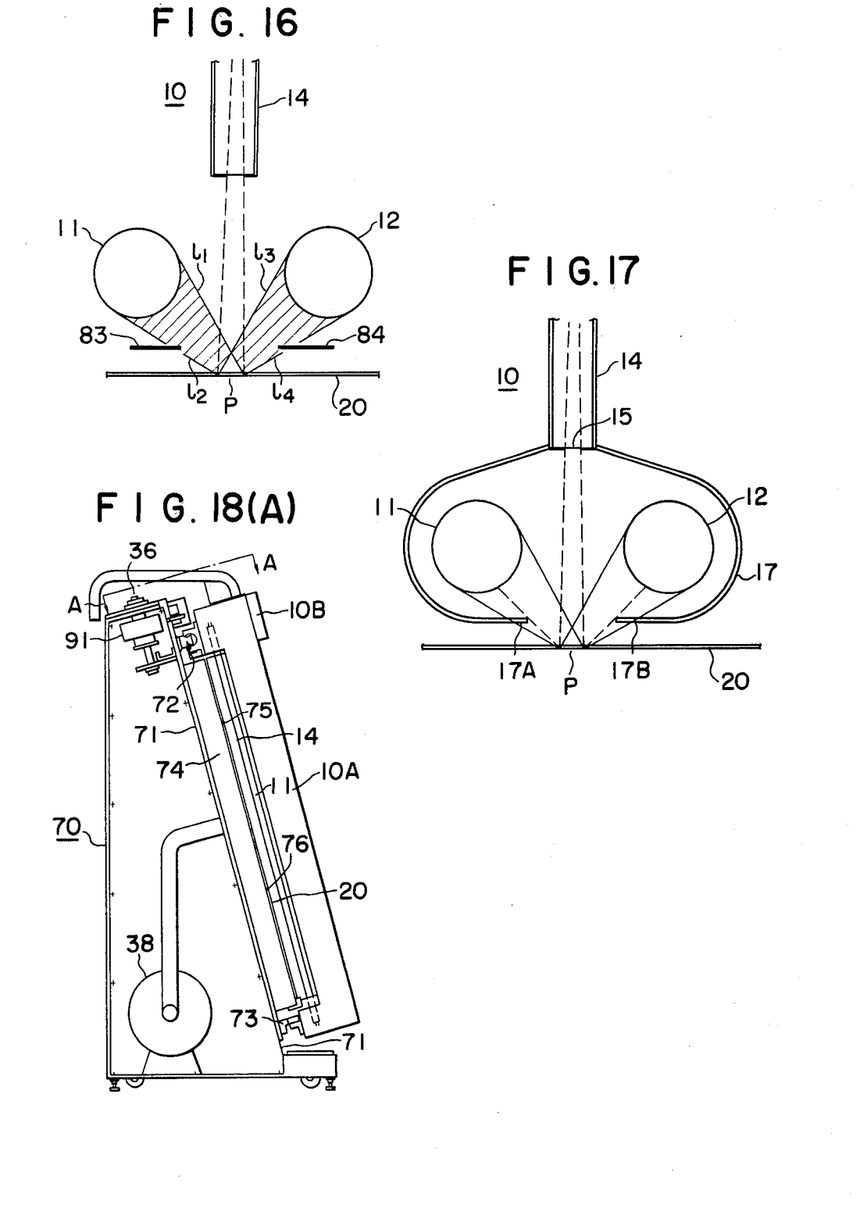

In the case where the distance (x) of the printing plate 20 is larger than 0.7 K and smaller than K (0.7 $K < x < K$), light intercepting boards 83 and 84 are disposed in spaces defined by the segments $1_2$ and $1_4$ as shown in FIG. 16. The light intercepting boards 83 and 84 may be replaced by extending the bottom plates 17A and 17B of the light intercepting box 17 as shown in FIG. 17. In the latter case, the illumination is maintained low in the normal operation, and it is increased for correction when the printing plate 20 is shifted upwardly.

Figure 18B:
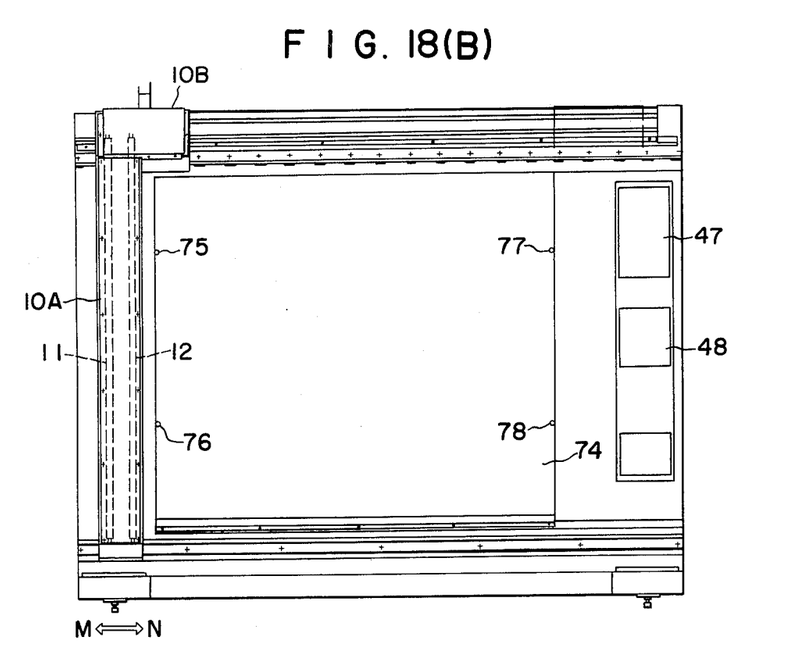
Figure 18C:
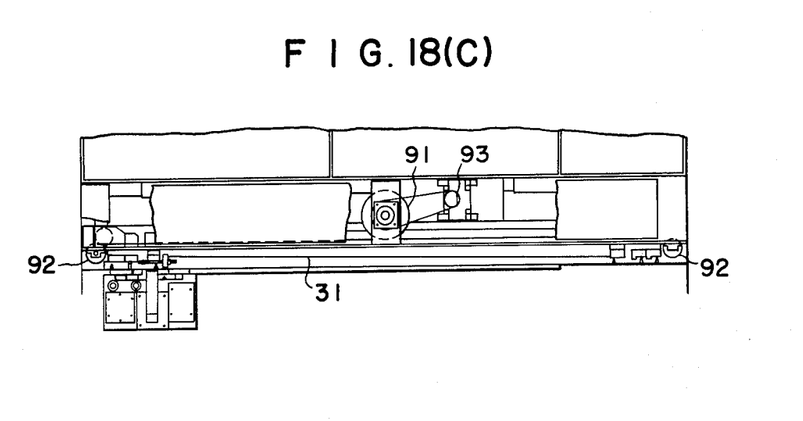

Another example of the measuring device of the invention is as shown in FIG. 18. A measuring device body 70 has a sloped front panel 71, which has guide rails 72 and 73 at the upper and lower edges respectively. A stage 74 of a protruded structure for placing a printing plate 20 is provided at the central portion of the front panel 71. The printing plate 20 is positioned in place with pins 75 through 78, and is sucked and retained on the stage 74 by a suction device 38. The stage 74 is made of a porous sheet or a plate having a number of minute holes. A box-shaped scanning device 10A of a recessed structure is slidably arranged between the guide rails 72 and 73. The scanning device 10A includes the above-described photoelectric detector device 10 and its relevant circuit. The printing plate 20 is interposed between the scanning device 10A and the stage 74, as is clear from the above description. The scanning device 10A is moved in the direction of the arrow M or N by driving a scanning rope 31, as a result of which the photoelectric detector device 10 provided in the lower portion of the scanning device 10A line-scans the printing plate 20. Inputting means, such as a key board 47, for instructing the operation of the scanning device 10A and outputting means, such as a printer 48, for displaying the results of scanning of the scanning device 10A are provided laterally of the stage 74 on the front panel 71.

The scanning device 10A has a scanning mechanism the top portion 10B of which is fixedly secured to the scanning rope 31, which is wound on a drive roller 91 and an auxiliary roller 91 provided at both ends of the front panel 71. The scanning device 10A is slid along the guide rails 72 and 73 in the direction of the arrow M or N by turning the drive roller 91 with a drive electric motor 93. A rotary encoder 36 for detecting a position of the scanning device 10A is mounted on the rotary shaft of the drive roller 91. The aforementioned suction device 38 such as a suction pump is provided below the stage 74 to suck and retain the printing plate 20 on the stage 74.

The operation of the second example of the measuring device is similar to that of the first example.

With the measuring device according to the invention, a printing image area can be measured correctly irrespective of difference in printing process and difference in kind, lot and size of printing plates and without being affected by thermal deformation and distortion of printing plates which may be caused in the burning process, and printing image areas can be measured in correspondence to the width and number of ink adjusting keys which are different depending on the kinds of printing machines used. Therefore, it is unnecessary to provide the measuring device for every printing machine; that is, the provision of only one measuring device in a printing line is sufficient for measuring printing image areas.

With the measuring device of the invention, unlike the measuring device utilizing transparent copies (film original plates), a printing image area is measured by directly utilizing the printing plate, and therefore processing the measurement data of a printing image layout can be eliminated. Since the relative position of the printing plate and the detection means in the measuring device of the invention is scarcely affected by the mechanical error of the measuring device and by deformation of the printing plate. The measuring device is simple in construction and low in manufacture cost, and yet can achieve its measurement with high accuracy.

An in-line automatic measurement in a printing line can be achieved with the measuring device of the invention, with a small burden in measurement operation. With the printing image measurement data, the operational efficiency of the printing machine can be improved by presetting the ink adjusting keys at the start of the printing machine, and the number of unsatisfactory printed copies can be reduced. In addition, the measurement data has a variety of special color inks to be prepared in advance, and determination of the optimum conditions for drying apparatus to reduce fuel expenses.

The measuring device of the invention is of a stand type and is provided with the input and output means. Therefore, the measuring device is excellent in operability and high in work efficiency. Furthermore, the number of changes of causing work errors such as for instance indenting printing plates is reduced. The space occupied by the measuring device is relatively small. As the detecting head (i.e. the scanning device) is moved, the work area is smaller than that which is required in the case of moving the printing plate.

In the above-described examples of the measuring device, the rotary encoder is used to detect the positions of the photoelectric detector device for detection timing; however, a method may be employed in which a pulse motor is used as the drive motor and the photoelectric detector device is moved by a timing pulse provided by the CPU, or a method may be employed in which the photoelectric detector is moved at a constant speed by a servo motor or a synchronous motor and the position detection is timed with a timer. The fluorescent lamps used as the light source may be replaced by xenon lamps, neon lamps or halogen lamps. Furthermore, photo transistors may be used as the photoelectric detector units.

In the case where a printing plate has a positive type resist layer, it is desirable that light applied thereto has a wavelength of about 650 nm, because the resist layer is, in general, green and is disintegrated by light having wavelengths ranged from 350 nm to 500 nm. The use of the light about 650 nm in wavelength prevents the disintegration of the resist layer and improves the optical contrast of the printing area and the nonprinting area, which contributes to the provision of correct measurement values.

It is not always necessary that the light intercepting boards 81 through 84 in FIGS. 13 and 16 can completely intercept light; that is, they may be semi-transparent plastic plates.

It is preferable that the scanning is carried out with the printing plate sucked and retained on the stage, because even if the printing plate is made uneven by baking or the like, the distance between the printing plate and the light source assembly can be more positively set to be 0.35 to 0.70 times the distance between the light sources forming the light source assembly, and therefore the detection values can be provided with higher accuracy.

What is claimed is:

1. Apparatus for measuring the printing image area on a printing plate, comprising:
   a printing plate having a front side containing an imaged region having printing thereon and a calibration mark offset from the imaged region,
   a stage means for holding the back side of the plate in a registration against a flat retaining surface,
   a photoelectric means having a light source for providing a line of light extending laterally across the plate and a plurality of detectors including a calibration detector also disposed laterally across the plate for receiving reflected illumination from the imaged plate region and providing an output signal indicative of the amount of reflected light incident thereon, said calibration detector being also connected to the photoelectric means that is arranged to receive reflected light from the calibration mark and to provide an output signal indicative thereof,
   scanning means for moving the photoelectric means longitudinally along the length of the plate to scan unitary areas on the plate surface, and
   processing means operatively connected to the output of the image area detectors and the calibration detector for averaging the amount of light reflected from the imaged region and adjusting the averaged data in proportion to the amount of light reflected by the calibration mark.

2. The apparatus of claim 1 wherein the printing plate is of a positive type and the light applied thereto is out of the range of sensitization wavelengths of the plate.

3. The apparatus of claim 1 wherein said processing means includes a keyboard, a read only memory, a random access memory and a central processing unit, said processing means having a processing program stored in the read only memory or in said random access memory that can process data for controlling ink adjusting keys of different printing machines.

4. The apparatus of claim 1 wherein said light source includes two linear lamps arranged in parallel for directing a line of light to a detection region on said plate.

5. The apparatus of claim 4 wherein the lamps are set at a vertical distance 0.35 to 0.70 times the distance between said two lamps so that the two lamps are equal distance from said detection region.

6. The apparatus of claim 1 wherein there is further provided a light detector positioned to sense the illumination from said light source that is connected to the processing means to provide data thereto indicative of changes in the amount of illumination.

* * * * *